Patented Apr. 8, 1941

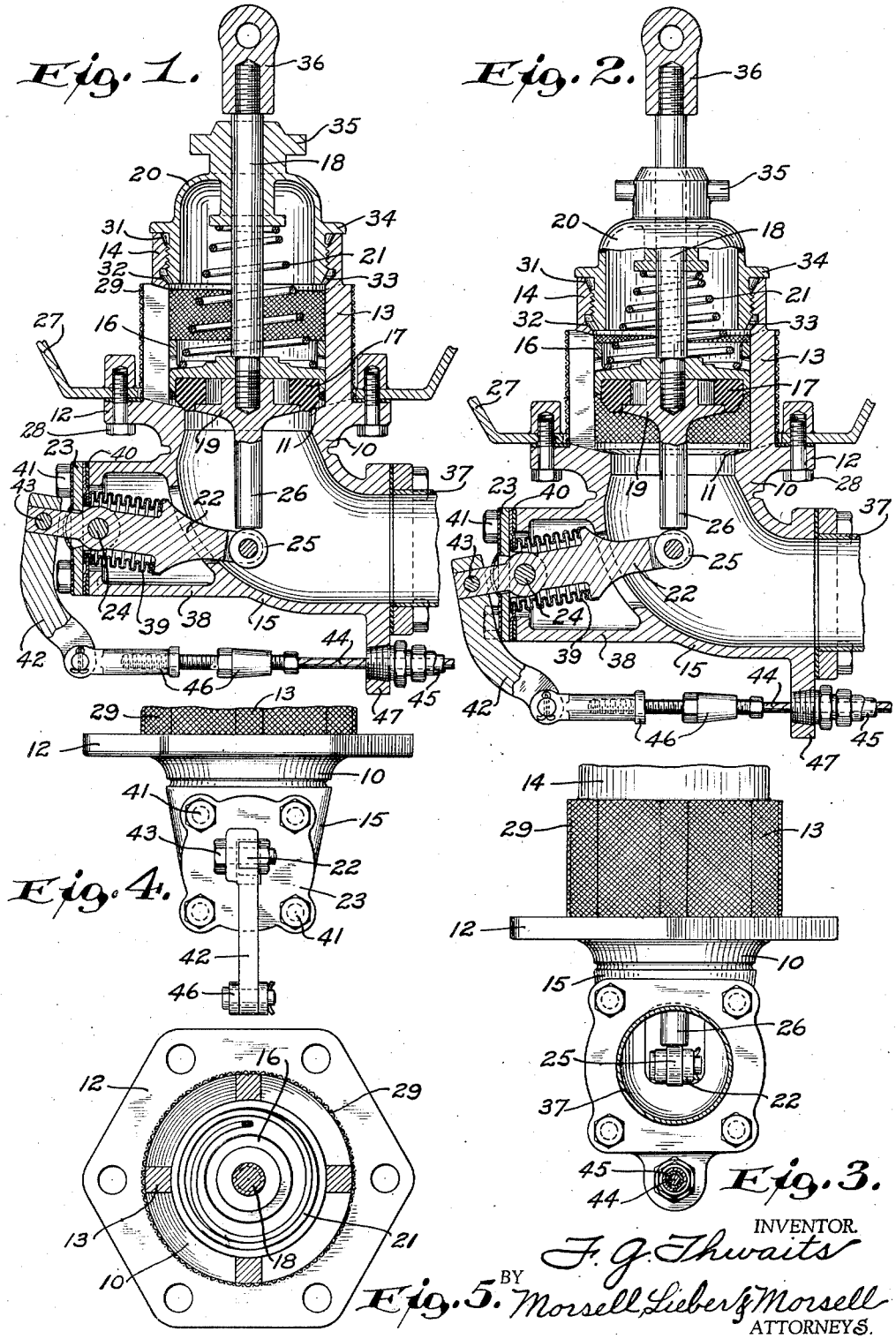

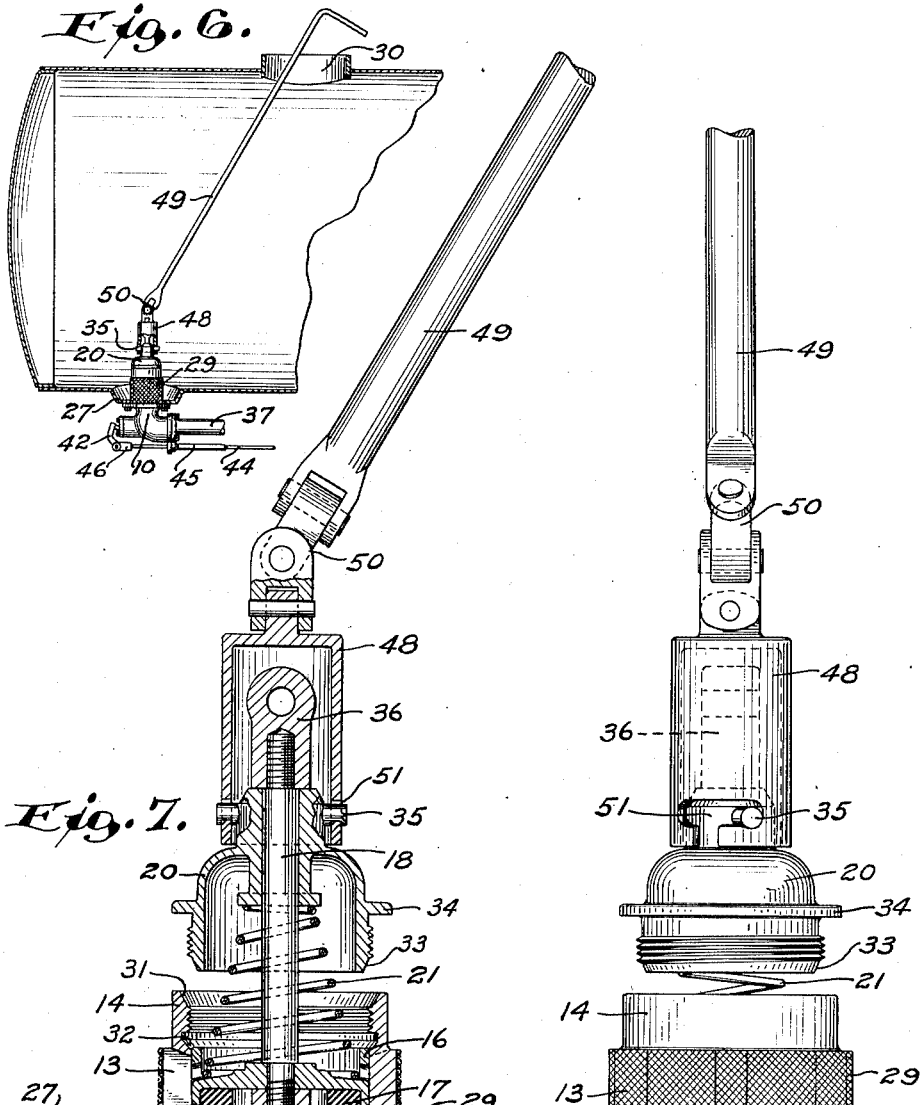
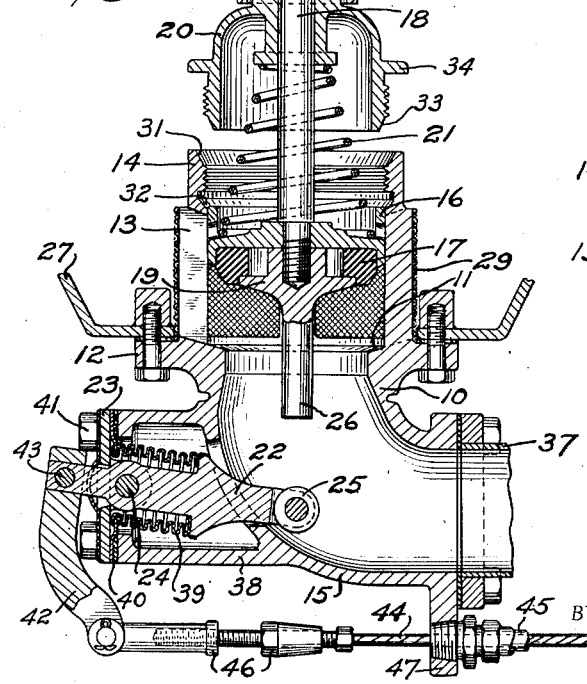

2,237,377

UNITED STATES PATENT OFFICE 2,237,377

EMERGENCY VALVE

Frederick G. Thwaits, Wauwatosa, Wis., assignor to The Heil Co., Milwaukee, Wis., a corporation of Wisconsin Application January 6, 1939, Serial No. 249,631

3 Claims. (Cl. 137—21)

My present invention relates generally to improvements in valve assemblages, and relates more specifically to various improvements in the construction and operation of emergency valves for controlling the flow of liquid from vehicular tanks or similar containers.

Generally defined, an object of this invention is to provide a new and useful emergency valve assemblage, which is simple in construction and efficient in operation, and which may be readily assembled and dismantled.

It is common commercial practice in the art of transporting inflammable liquids such as gasoline, to provide the conveying receptacle or tank with so-called emergency valves at the several outlet openings near the tank bottom. The liquid transporting tank is frequently divided by partitions into several compartments for receiving segregated batches of liquid, and each compartment is provided with a manhole at the top and with an emergency valve controlled outlet at its bottom but not necessarily in vertical alinement with the manhole. All of the emergency valves are ordinarily controllable manually from a common station located at one end of the tank, by means of motion transmitting connections usually located externally beneath the tank, and are also operable automatically in cases of emergency through these same connections. In order to inspect, install and remove the emergency valves of these prior assemblages, it is necessary to enter the tank compartment through the upper manholes, and the prior valve assemblages of this type are undesirably complicated and frequently become leaky thus permitting escape of the inflammable fluid and creating fire hazard.

It is therefore an object of my present invention to provide an improved emergency valve, of exceedingly simple construction, which is most effectively guarded against possible leakage and which is readily operable from a remote control station.

Another specific object of my invention is to provide an improved valve assemblage wherein the valve is spring-pressed, and in which the combined spring and valve plunger may be removed from the valve cage from the exterior of the tank and without entirely releasing the spring tension.

A further specific object of the present invention is to provide an improved emergency valve for liquid transporting tanks, which is extremely reliable in operation, which is conveniently accessible, and which may be manufactured and sold at moderate cost.

These and other objects and advantages of the invention will be apparent from the following detailed description.

A clear conception of embodiments of the several features constituting the present invention, and of the manner in which the improved emergency valves may be constructed, installed and manipulated, may be had by referring to the drawings accompanying and forming a part of this specification wherein like reference characters designate the same or similar parts in the various views.

Fig. 1 is a central vertical section through one of my improved emergency valves, showing the same in normal operating condition with the valve closed;

Fig. 2 is a similar central vertical section showing the valve open;

Fig. 3 is a fragmentary side elevation of the valve assemblage of Fig. 1, looking toward and into the liquid discharge pipe and elbow;

Fig. 4 is another fragmentary side elevation of the assemblage, looking in the opposite direction and toward the outer end of the valve actuating lever;

Fig. 5 is a transverse horizontal section through the valve assemblage, taken through the valve cage and actuating spring;

Fig. 6 is a longitudinal central vertical section through a fragment of a tank showing one of the improved valves installed therein, and also illustrating the mode of effecting removal and insertion of the valve and spring assembly;

Fig. 7 is a central vertical section through one of the valve assemblages, showing the method of manipulating the valve plunger and spring assembly from a remote point; and Fig. 8 is a side elevation of the upper portion of the mechanism shown in Fig. 7.

While the invention has been shown embodied in an emergency valve especially adapted for use in a liquid transporting tank, it is not the intent to thereby unnecessarily restrict the scope.

Referring to the drawings, my improved valve comprises in general a one piece valve cage 10 having a tapered valve seat 11 and an attaching flange 12 at its medial portion, upright plunger guides 13 formed integral with the medial cage portion and interconnected by an internally threaded upper ring 14 above the seat 11, and an elbow 15 formed integral with and extending downwardly away from the seat 11 and flange 12; a valve plunger 16 slidable along the guides 13 and carrying a valve disk 17 which is cooperable with the seat 11; a valve stem 18 secured to the plunger 16 by means of a valve disk retainer 19, and extending upwardly through a cap 20 which has screw thread coaction with the interior of the ring 14; a compression spring 21 coacting with the plunger 16 and with the cap 20 and constantly urging the valve disk 17 toward the seat 11; a valve opening lever 22 swingably suspended from a normally fixed plate 23 by means of a pivot pin 24, and having at its inner end a roller 25 coacting with a depending projection 26 formed integral with the disk retainer 19; and mechanism coacting with the opposite end of the lever 22 for swinging the lever about the pin 24.

The flange 12 of the cage 10 may be firmly attached to the bottom 27 of a container such as a sheet metal tank, by means of cap screws 28 as shown in Figs. 1, 2 and 7, and an annular screen 29 may be placed snugly around the fixed guides 13. The container or tank may be subdivided into a series of compartments each having an emergency valve associated with the lower outlet thereof, and each compartment is preferably provided with a manhole 30 in the upper tank portion as shown in Fig. 6. In order to insure complete drainage, each of the emergency valves is preferably located within a local pocket or depression in the tank bottom 27 and the joint between the flange 12 and bottom 27 is sealed by a suitable gasket or the like.

The valve plunger 16 is snugly confined within the cage 10 but is freely vertically reciprocable within the fixed guides 13 so as to permit effective seating of the disk 17 against the tapered seat 11. The disk 17 may be formed of rubber or other suitable material capable of effecting tight closure, and the disk 17, stem 18 and retainer 19 are normally simultaneously movable with the plunger 16 being clamped thereto by the retainer 19 coacting with the threaded end of the stem 18. The plunger 16 is however of such diameter that it may be removed freely through the internal screw threads of the ring 14, and this ring has tapered annular surfaces 31, 32 on opposite sides of the threads for guiding the plunger 16 centrally into the cage 10 during insertion of the plunger and valve unit. The upper cap 20 within which the valve stem 18 is slidable and which has screw thread coaction with the ring 14, is provided with a tapered end portion 33 adapted to coact with the ring surface 31 in order to guide the screw threads into proper coaction with each other, and this cap 20 has a flange 34 cooperable with the ring 14 in order to stop the downward motion of the cap during application thereof to the ring. The upper end of the cap 20 has outwardly projecting diametrically opposite pins 35, and the upper extremity of the valve stem 18 is provided with a fitting 36 having an opening therein to which a hook may be applied for direct manual lifting of the valve plunger 16 from above. The compression spring 21 which coacts with the plunger 16 and reacts against the cap 20 constantly urges the valve disk 17 downwardly, and the fitting 36 forms a stop for preventing complete expansion of the spring 21 when the cap 20 and valve plunger 16 are removed from the cage 10 as in Fig. 7.

The elbow 15 which is formed integral with and extends downwardly from the flange 12, communicates with a liquid discharge pipe 37, and is provided with an integral casing 38 to which the plate 23 is attached and through which the lever 22 extends. The end of the lever 22 which carries the roller 25 is swingable in approximately vertical alinement with the axis of the projection 26 within the elbow 15, and an annular corrugated seal 39 is disposed within the casing 38 and has one end attached to the lever 22 while its opposite end is secured to the plate 23 by means of a sealing gasket 40. The opposite ends of the seal 39 are attached to the lever 22 and plate 23 respectively so as to provide perfectly sealed joints at these ends, and the seal 39 is freely laterally deflectable during swinging of the lever 22. The pivot pin 24 coacts with integral ends of the plate 23, within the bellows seal 39, and the lever 22, pivot pin 24 and seal 39 are removable with the plate 23 as a unit, upon removal of the cap screws 41.

The mechanism for swinging the lever 22 so as to open the emergency valve, comprises an arm 42 rigidly attached to the outer end of the lever 22 by means of a pin 43, and a flexible cable 44 slidably confined within a conduit 45 and connected to the lower extremity of the arm 42 by an adjustable connection 46. The cable confining conduit 45 may be attached to a lug 47 formed integral with the elbow 15, and the tension of the cable 44 may be varied by adjustment of the connection 46 in a well known manner. The cables 44 of all of the emergency valves may lead to a common operator's station, and the actuating mechanism for each valve is ordinarily provided with a fusible element which will melt in case of fire and will thus permit the springs 21 to automatically close the several valves and prevent further escape of liquid from the compartment of the tank or container.

In order to facilitate removal of the movable valve parts from the fixed cage 10, and subsequent reinsertion of these parts in the cage, from the tank exterior and through the manhole 30 of a tank such as shown in Fig. 6, I provide a special socket 48 and a manipulating rod 49 which is connected to the socket 48 by a universal joint 50. The socket 48 is provided with diametrically opposite bayonet slots 51 which are formed to coact with the cap pins 35 as illustrated in Figs. 7 and 8. With this assemblage of elements, the socket 48 may obviously be applied to the pins 35 through a manhole 30 as indicated in Fig. 6, and by giving the rod 49 a twist the pins 35 will become seated in the slots 51 as shown in Fig. 8. The cap 20 may then be unscrewed from the ring 14, and during the initial release of this cap, the upper extremity thereof will engage the fitting 36 as in Fig. 7. Subsequent withdrawal of the cap 20 will cause the stem 18, plunger 16 and spring 21 to move with the cap as a unit, so that the spring 21 will not be entirely relieved of tension. After the cap 20 has been removed, the plunger 16 and valve disk 17 may be freely withdrawn from the cage 10 in the manner illustrated in Figs. 7 and 8. Reassembly of the valve may be just as readily effected with the aid of the rod 49 and socket 48 from the exterior of the tank, and the tapered surfaces 31, 32, 33 serve to guide the various elements into proper position during the assembling operation. During this assembling operation, the valve ring or disk 17 will engage the seat 11 before the stop flange 34 of the cap 20 contacts the stationary cage ring 14, and the final motion of the cap 20 will finally compress the spring 21 and thus insures tight closing of the valve. The lever 22 should preferably be swung down as in Fig. 7 in order to prevent obstructing the downward movement of the projection 26 when the valve is being assembled.

After the improved emergency valve has been assembled, it will normally be closed as indicated in Fig. 1. The spring 21 will then be effective to close the valve disk 17 and no liquid can escape from the tank past the valve seat 11. By exerting a pull on the actuating cable 64, the lever 22 will be swung upwardly and the roller 25 will engage the projection and will positively lift the valve against the action of the spring 21. Liquid may then flow from the tank past the screen 27 and seat 11 and through the elbow 15 and pipe 37, until the valve is again closed by releasing the pull on the cable 44 thus permitting the spring 21 to become effective to seat the valve disk 17. During oscillation of the lever 22 about the pivot pin 24, the bellows seal 39 will flex, but the opposite ends of this seal 39 will remain tightly seated against the lever 22 and against the plate 23 respectively, so that no liquid can escape past this seal.

From the foregoing detailed description it will be apparent that my present invention provides an improved emergency valve which is extremely simple and compact in construction and which will not permit undesirable leakage of liquid to the exterior of the tank and valve structure. The valve assemblage may obviously be readily applied to a tank from the exterior of the tank bottom 27 by merely attaching the flange 12 to the tank with the aid of the bolts 28. The lever 22 may be quickly and conveniently removed from the cage 10 by merely withdrawing the bolts 41, and may be just as easily reapplied. The movable sealing disk 17, plunger 16, stem 18, cap 20, and spring 21, of the valve may be quickly and conveniently removed as a unit, with the aid of a socket 48 and rod 49 as indicated in Fig. 6, and these movable valve parts may be just as easily reapplied to the cage 10. An important feature of my present improvement is that the tension of the spring 21 need not be entirely released upon removal of the cap 20 and plunger 16, and the final spring tension is re-established by merely replacing the cap 20 within the ring 14. The fitting 36 at the upper extremity of the valve stem 18, will also permit the valve to be manipulated manually from above, if so desired, and the lever 22 obviously offers minimum obstruction to the flow of liquid. All portions of the improved valve are obviously readily accessible for inspection and replacement of parts, and the improved assemblage has proven highly satisfactory in actual commercial use.

It should be understood that it is not desired to limit this invention to the exact details of construction or to the precise mode of operation herein shown and described, for various modifications within the scope of the claims may occur to persons skilled in the art.

I claim:

1. In an emergency valve, a valve cage having a seat, a valve plunger movable toward said seat, a lever having a roller journalled on its end and swingable to engage and move said plunger away from said seat, said lever extending outwardly through said cage and having a rigid actuating arm extending laterally from its outer end, a flexible diaphragm seal having inner and outer edge portions, said edge portions being fixedly attached to said lever and said cage respectively so as to seal the opening through which said lever projects and said seal being deflectable intermediate said edge portions during swinging of said lever, and means coacting with said arm and being movable longitudinally of said lever for swinging said roller to actuate said plunger.

2. In an emergency valve, a valve cage having a seat, a valve plunger movable by a spring toward said seat, a lever having a roller journalled on its end and swingable to engage and move said plunger away from said seat in opposition to said spring, said lever extending outwardly through said cage and having a rigid actuating arm extending laterally from its outer end, a flexible diaphragm seal having its inner edge fixedly attached to said lever and its outer edge fixedly attached to said cage so as to seal the opening through which said lever projects, said seal being deflectable between said edge portions during swinging of said lever, and means coacting with the end of said arm remote from said lever and being movable longitudinally of the latter to swing said roller to actuate said plunger.

3. In an emergency valve, a one piece valve cage having a seat and being provided with integral valve guides on one side of the seat and with an integral elbow conduit on the opposite side thereof, a valve plunger movable toward and away from said seat along said guides and having a stem projecting into said conduit, a lever having an end swingable within said conduit and provided with a roller engageable with said stem to actuate said plunger, said lever extending outwardly beyond said cage through an opening in said elbow conduit, a flexible diaphragm seal having its inner edge portion attached to said lever and its outer edge portion attached to said cage and an arm rigidly attached to said lever externally of said cage and having its end remote from said lever swingable longitudinally of the latter to actuate said plunger through said roller and said stem.

FREDERICK G. THWAITS.